United States Patent Office 3,506,364
Patented Apr. 14, 1970

3,506,364
COLOR RENDITION INDEX METER
Joel Shurgan, Washington Township, Bergen County, and Luke Thorington, Berkeley Heights, N.J., assignors to Duro-Test Corporation, North Bergen, N.J., a corporation of New York
Filed Mar. 31, 1966, Ser. No. 539,167
Int. Cl. G01j 3/46, 1/42, 1/44
U.S. Cl. 356—173                                14 Claims

ABSTRACT OF THE DISCLOSURE

Apparatus for determining the C.I.E. color rendering index of "white" type fluorescent sources in which the ratio of the irradiance to the illuminance of the light is measured.

---

Figure 1:
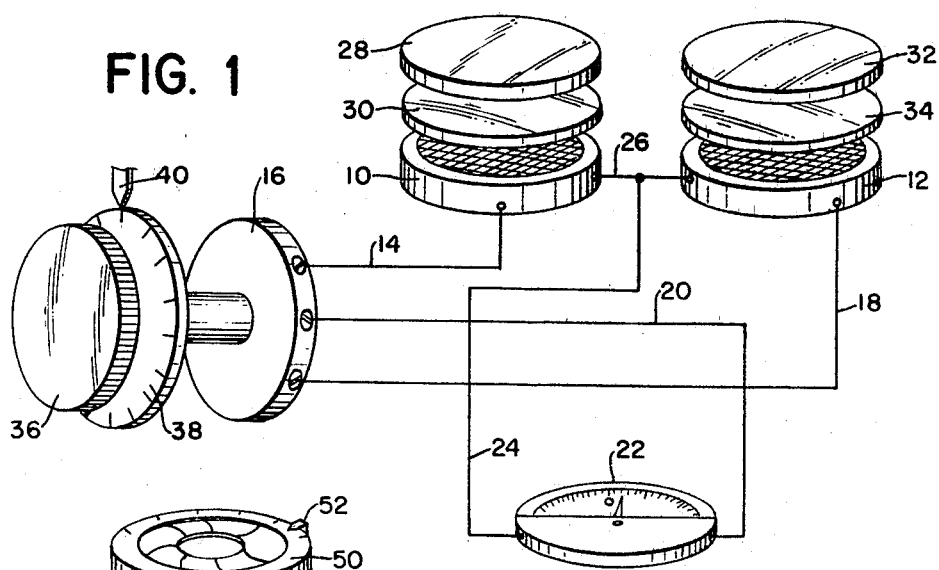

This invention consists of combinations of electrical components by means of which the color rendering properties of "white" fluorescent lights can be determined in the field.

The basic concept of the subject matter of this invention is the provision of a mechanism, which can take a portable form, by means of which the ratio of illuminance to irradiance for "white" fluorescent lights can be directly correlated with the color rendering index as defined by the International Commission on Illumination, usually indicated by the symbol C.I.E.

It is understood in this art that illuminance is defined as the amount of light seen on a given area and can be measured in foot candles. Irradiance is defined as the light energy per unit area, for example, as watts per square foot. The difference between the two lies in the response of the human eye to light of different wave lengths. As is well understood, the human eye is not very sensitive to deep red, for example. Therefore, a very high level of irradiance in the deep red will produce very little stimulation of the brightness sensors in the eye and therefore the illuminance will be very low. The same irradiance in the green portion of the spectrum will evoke a substantial response in the sensors of the eye and the illuminance will be large, reaching its maximum at about 555 nanometers.

The basic concept of color rendering ability has been extended by the C.I.E. and the Illuminating Engineering Society to a numerical value which correlates the reflectances of the test and standard sources of the same color temperature from eight specified Munsell papers. As is well understood this is an involved procedure and totally unsuited to field applications. In accordance with this invention advantage is taken of our discovery that the ratio of luminosity factors of the test source and the standard is related to the C.I.E. chromaticity index in a simple fashion so that all that is required is to determine the luminosity factor for "white" fluorescent lamps. For a detailed description of the underlying basis of our discovery reference is made to a paper entitled "A Simple Empirical Method for Measuring Color Rendering Index" by Joel Shurgan, which was presented at the National Technical Conference of The Illuminating Engineering Society Aug. 29 to Sept. 2, 1965 at New York, N.Y. and which appears at page 266 of vol. LXI of Illuminating Engineering. Our invention requires only that the ratio of illuminance to irradiance be determined making a simple meter for commercial use in the field to determine the C.I.E. color rendering index possible.

This ratio can be measured by means of two sensing devices, one of which reacts in much the same manner, that is spectrally, as does the human eye, and the other which reacts to the power density independently of color, that is spectrally "flat."

As disclosed hereinafter, a number of relatively simple combinations are disclosed by means of which this ratio is measured, including indicating means for correlating this ratio with the color rendering index as defined by the C.I.E.

Figure 2:
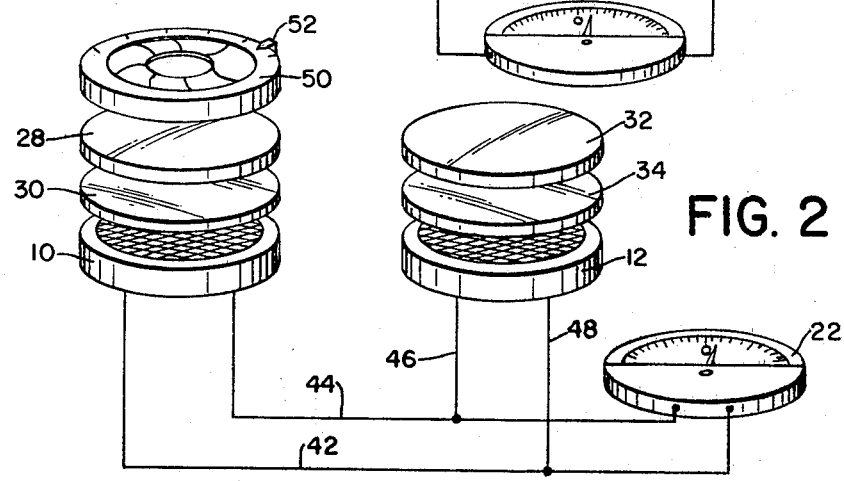
Figure 3:
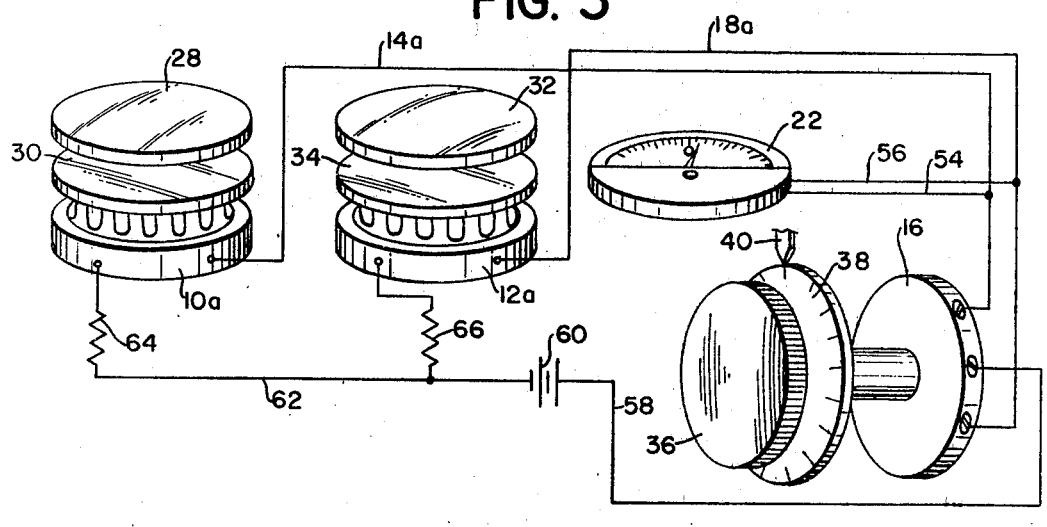
Figure 4:
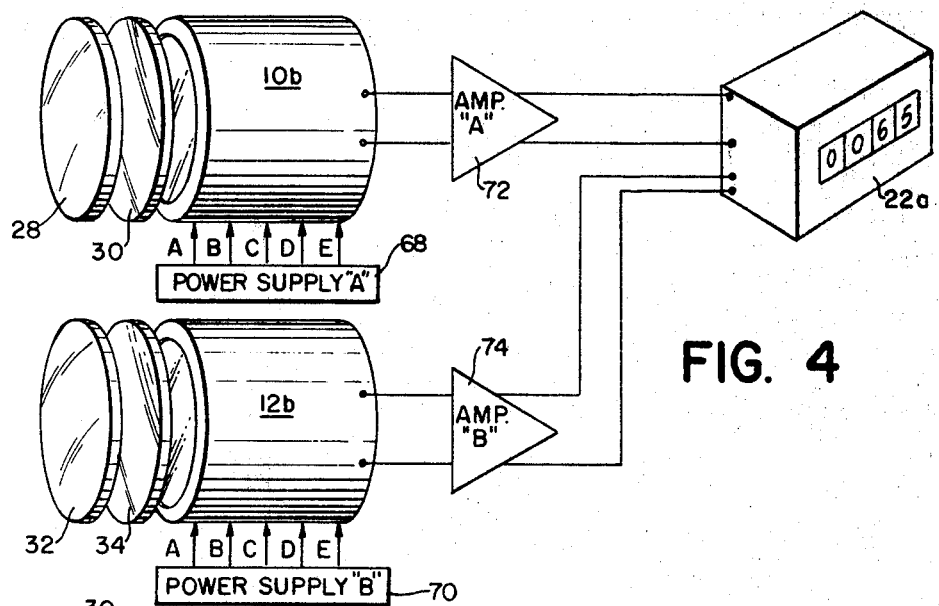
Figure 5:
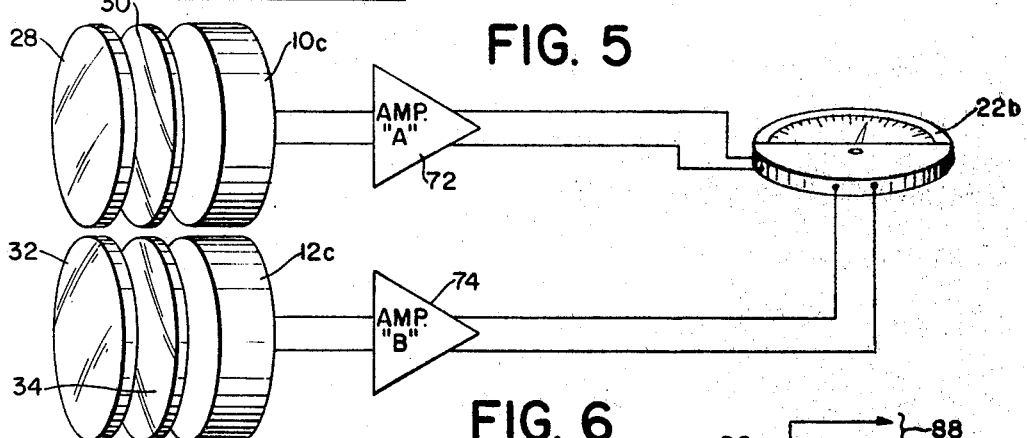
Figure 6:
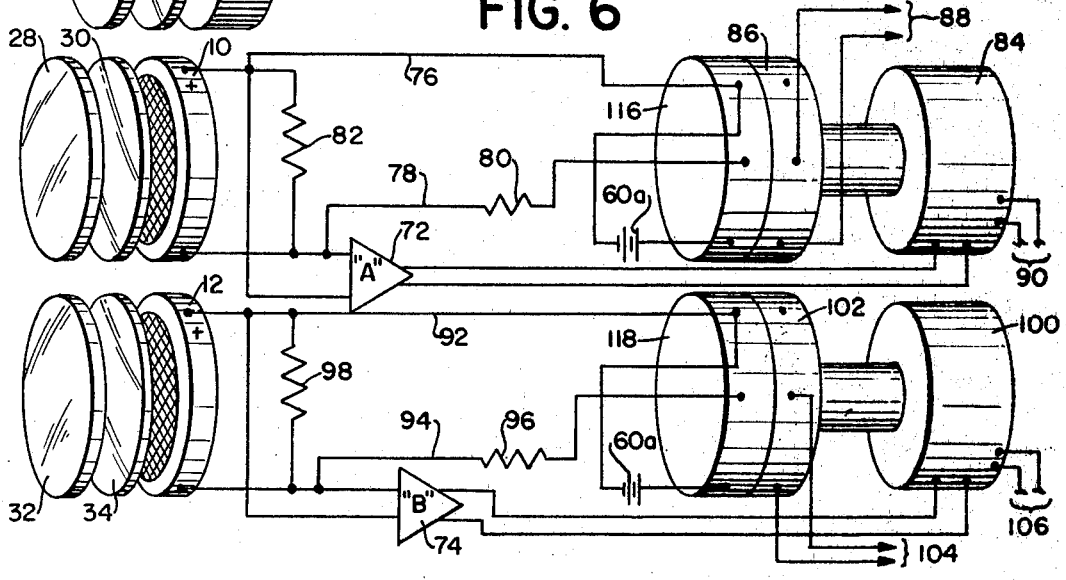

In the accompanying drawings:

FIGURE 1 shows diagrammatically one form of the invention using sensors respectively responsive to the illuminance and irradiance of "white" fluorescent lights;

FIGURE 2 diagrammatically illustrates a system similar to that of FIG. 1, using an optical attenuator to reduce one signal to the level of the other so that the meter is nulled;

FIGURE 3 is a system similar to that of FIG. 1, wherein the sensors are photoconductors;

FIG. 4 diagrammatically illustrates a system using two photomultiplier tubes and a digital ratiometer responsive to the outputs of said photomultipliers;

FIG. 5 diagrammatically illustrates another form of the invention using thermopiles and a meter type ratiometer; and FIG. 6 diagrammatically illustrates a form of the invention employing servo systems by means of which the illuminance and irradiance are read out on conventional current bridges and nulled by the servo mechanism.

In the system of FIG. 1 the outputs of two photosensitive devices which are proportional to the illuminance and irradiance respectively are interacted in a bridge circuit so that when the bridge circuit potentiometer element is rotated to a point where the current through a suiable meter is reduced to zero, the angular displacement of the rotated shaft can be read out in terms of the index required. In the system of FIG. 1 there is illustrated a pair of light sensitive photocells 10 and 12, which generate electric current when exposed to light. For best results with the filters mentioned below the cell 10 should be a silicon cell and the cell 12 should be a typical selenium cell. One terminal of the cells is connected respectively to the terminal contacts of a potentiometer 16 by means of the conductors 14 and 18. The center or brush connection of the potentiometer is connected by the wire 20 to one terminal of a current responsive galvanometer 22. The other terminal of the galvanometer is connected by the wire 24 to the common connection 26 for the remaining terminals of the photocells. For clarity it is noted that the potentiometer connections for the wires 14 and 18 correspond to the ends of the resistor of the potentiometer. The contact adjustor for the potentiometer is moved by a finger knob 36 on wh'ch is mounted a calibrated dial 38 cooperating with the fixed pointer 40.

In order to make the photocells responsive respectively to the illuminance and irradiance of the light source it is necessary to use a filter system. The filter 30 for the cell 10 corrects the cell to substantially flat response, that is to irradiance. The filter 34 for the cell 12 corrects the response of this cell so as to respond as does the human eye, making the cell responsive to the illuminance of the source. The cells are respectively supplied with suitable diffusers 28 and 32 so as to distribute light evenly over the surface of the photo cells.

Specifically, the diagrammatically illustrated filter 30 can be a Kodak Wratten CC05 filter and a Corning 5900 filter, 45% standard thickness. Similarly, the filter 34 can be a Kodak Wratten 102 filter.

As indicated in FIG. 1, the galvanometer 22 is constructed and calibrated so as to be capable of null operation. To use the system of FIG. 1 the device, which can be assembled into a small compact portable instrument, is simply exposed to the light source whose color rendering index is sought. The light shining on both of the photo cells 12 and 10 through their respective filtering systems causes the generation of two currents, one of which is proportional to the illuminance and the other to the irradiance of the source. The potentiometer 16 is then adjusted by means of the knob 36 until a null or zero reading is obtained on the galvanometer 22. In effect this means that the ratio of the two currents has been determined. However, the dial 38 is calibrated against a standard source or sources of known C.I.E. color rendering index so as to carry the C.I.E. index. Thus, upon establishment of a null reading the pointer 40 will indicate the C.I.E index for the particular light source being studied. Thus, by means of a very simple portable device and the use of circuitry which determines the ratio of illuminance to irradiance, it is possible to quickly determine without calibration the color rendering index of the light source.

The system of FIG. 2 is similar in many respects to the system of FIG. 1, but differs in the feature that the adjustment is effected by optical attenuation. In FIG. 2 the parts that are similiar to the parts in FIG. 1 are given the same reference characters. Thus, the photocells and filtering systems are the same as for the galvanometer. The output of cell 10 is combined with the output of cell 12 through the parallel circuit connection 42–44 and 46–48. Adjustment in this case, however, is effected by the use of an iris structure 50 which has the rim of its adjustable part provided with the C.I.E. color index scale. In this case a fixed pointer 52 serves to indicate the color rendering index of the light source when the arrow 50 is adjusted to obtain a null reading on the galvanometer.

In the system of FIG. 3 instead of using ordinary photocells, photoconductors are used. These are shown at 10a and 12a. As is well known in the art, a photoconductor is a device whose resistance decreases with increasing illumination. Thus, when connected in series with a voltage source the current through the circuit and, therefore, the potential across a resistor in the circuit will decrease with illumination. Such a circuit is shown in FIG. 3, wherein one terminal of the photoconductor 10a is connected through the resistor 64 by means of the conductor 62 to the negative terminal of a potential source 60. The positive terminal of the potential source 58 to the center of brush contact of the potentiometer 16. The corresponding terminal of the photoconductor 12a is connected through resistor 66 to the negative terminal of the potential source 60. The other terminals of the photoconductors are connected respectively by the conductors 14a and 18a to the end terminals of the potentiometer. The null type galvanometer is connected across those conductors by the connections 54 and 56 respectively. The filtering systems for the photoconductors can be like those of the previous arrangements in overall spectral response.

The operation of this circuit is obvious in that when the potentiometer 16 is adjusted to give a null reading on the galvanometer 22 the color rendering index for the light source is indicated on the dial 38.

In the system of FIG. 4 the sensors for measuring illuminance and irradiance of the light source take the form of photomultipliers 10b and 12b. As is well known, photomultipliers are electronic devices having some of the characteristics of vacuum tubes in which electron currents produced by light falling thereon are amplified in successive stages by secondary electron emission. As is well known, the multiplying circuits require high voltage low current power sources. One advantage of their use is their sensitivity to very low light intensities and their linear response characteristics. As shown in FIG. 4, the photomultipliers are provided with suitable power supply sources 68 and 70 as is well understood in the art. The filtering systems used here should give the same spectral responses as has been previously described. The outputs of the photomultipliers 10b and 12b are amplified by the respective amplifiers 72 and 74, whose outputs in turn are applied to a digital ratiometer 22a. This device can be calibrated so that the combined effect of the application of the outputs of the amplifiers is to give the digital reading which, through calibration, will give the correct S.I.E. color rendering index for the light source being tested.

In FIG. 5 there is illustrated a different form of the system in which the sensors comprise the thermopiles 10c and 12c. These devices are well known and operate on the principle that heating a junction of dissimilar metals produces a current. In the photodetector type of thermopile light energy is absorbed by a blackened surface forming part of the instrument and thereat converted into heat. Here again the light filtering systems used should give the same spectral responses as in the system of FIG. 1. The outputs of the thermopiles are amplified in the amplifiers 72 and 74 and the outputs thereof are supplied to a galvanometer 22b which in this case is a meter type of ratiometer well known in the electrical art. This ratiometer 22b will combine the output currents of the two amplifiers so as to indicate on the dial thereof the C.I.E. color rendering index for the light source being tested. In this case it is obvious that the face of the ratiometer is calibrated like the dials 38 and the rim of the iris 50 of the preceding arrangements, so as to be a direct reading instrument similar to the digital ratiometer.

The final system illustrated in FIG. 6 is a servo type of system in which the illuminance and irradiance are read out on conventional current bridges and nulled by a servo mechanism. An obvious advantage of this system is its feature of automatically nulling the currents while the current bridge circuit reads the photocells at zero load, a condition known to be needed for maximum cell linearity.

As illustrated in FIG. 6, the sensors are photocells like the arrangements of FIGS. 1 and 2 and are provided with the same filtering systems. One output terminal of the photocells 10 is connected by the wire 76 to an end terminal of the potentiometer 116. The other terminal is connected by the wire 78 through the resistor 80 to the central or brush contact of the same potentiometer. A potential source 60a is connected across the end terminals of the resistor of this potentiometer. The terminals of the photocell 10 are also connected, as shown, to the input of the amplifier 72, the output of which supplies the controlling current for the servo motor 84. The operating current for this motor is supplied from any suitable source through the connections 90. A resistor 82 is connected across the terminals of the photocell 10. Ganged with the potentiometer 116 is a second potentiometer 86 and as shown the movable contacts of both potentiometers are connected to the shaft of the servo motor 84. The output current for this cell is supplied through the circuit wires 88 to any suitable indicating device such as, for example, a digital ratiometer like that shown in FIG. 4. These wires are connected to one one end of the resistor of the potentiometer 86 and to the movable contact as indicated. The circuit for the photocell 12 is similar, one output terminal thereof being connected by the conductor 92 to an end connection of the potentiometer 118. The other terminal is connected by the wire 94 through the resistor 96 to the brush contact of the potentiometer and the resistor thereof is shunted by the potential source 60a. The output terminals of the photocells 12 are connected to the input of the amplifier 74 and the output thereof supplies the controlling current for the servo motor 100, as shown. The photocell 12 is shunted by the resistor 98. Power is supplied to the servo motor 100 through the conductors 106 and its shaft is connected to the movable contact of the potentiometer 118 and the potentiometer 102 ganged therewith. The output circuit for potentiometer 102 is provided by the conductors 104 which supply the second signal to the digital ratiometer.

As those skilled in the art will understand from examining FIG. 6, the two photocells 10 and 12 measure the illuminance and irradiance of the light source being tested and the servo motors 84 and 100 are controlled by the outputs of the two photocells to cause the potentiometers 116 and 118 to be adjusted to a null condition. As a result, the potentiometers 86 and 102 are simultaneously adjusted to produce signals proportional to the illuminance and irradiance of the source which are applied to the digital ratiometer. Then, as in the system of FIG. 4, the C.I.E. color rendering index for the light source will be displayed on the ratiometer.

As further help in considering the system of FIG. 6 the following discussion is supplied. As illustrated in FIG. 6 the sensors are photo cells, like those used in FIG. 1, and are provided with the same filtering systems. As shown in FIG. 6, both cells are connected in identical circuits, the sole difference being the spectral response of the cell and filter combination. The circuit used is derived from one well known to the art, namely a current bridge. As usually applied, resistors 82 or 98 constitute the internal resistance of sensitive galvanometers, being in the order of 10,000 ohms. Resistors 80 and 96 can be from .1 megohm to 1 megohm and potentiometers 116 or 118, several hundred ohms. The servomotors, 84 and 100, the amplifiers 72 and 74 and the retransmitting potentiometers 86 and 102 are omitted. The voltage source, 60a can be as much as 16 volts. The potentiometer is usually rotated by hand until the galvanometer is nulled, the position of the potentiometer arm is then a direct measure of the light incident on the photocell. This circuit, well known in photometric art, is used in the Rubicon Bridge, manufactured by the Minneapolis Honeywell Corp., and by most photometric laboratories. In the form shown, the potential developed across the resistances 82 or 98, of less than 10,000 ohms, which can be simple high quality resistors, is amplified by an amplifier 72 or 74 and applied to a servo motor in a self nulling system (not shown in detail, although it is well known in the art, as in potentiometric recorders, etc.). Power is supplied to the motor through leads 90 or 106. This system automatically rotates the potentiometer to a position of null voltage across resistor 82 or 98. The angular position of the potentiometer shaft is then a measure of the irradiance in one case and the illuminance in the other. Hence, if potentiometer 86 and 102, on the same shaft as 116 and 118, are linear, the resistances between 88 and between 104 pairs of leads will be in proportion to the irradiance and to the illuminance. If these resistances are placed in series with a battery, the voltages developed across them will also be in that ratio and the ratio can be read by a digital ratiometer.

In all the systems herein disclosed the sensitivity of the sensors, be they photocells, photo-conductors, photomultipliers or thermopiles, may extend beyond the range of visible light. Thus, it will be necessary to select the filters 30 and 34 so that they are opaque to infrared and ultra-violet radiation.

It is again noted that in actuality the two sensing devices, one of which reacts in much the same manner (spectrally) as the human eye and the other which reacts to the power density independent of color, that is, it should be "spectrally flat" need only approximate actual conditions. The sensors need only be approximately accurate over the whole spectrum, since it is possible to obtain quite acceptable color rendering indices even with some distortions.

It is believed that those skilled in the art will understand that the meter ratiometer 22b is a double coil instrument made with shaped pole pieces so that it reads the ratio of the two currents supplied thereto. One such instrument available commonly is the Singermetrics (Sensitive Research) R.A. Unit.

Skilled circuit technicians will also recognize that alternating current circuits or "chopped" light techniques, both being well known in the art, are not excluded.

It will be apparent to those skilled in the art from the range of forms of the devices herein described that the subject matter of this invention is capable of substantial variation without departing from the novel subject matter of this invention.

What is claimed is:

1. Apparatus for determining the C.I.E. color rendition index of "white" type fluorescent light sources comprising first and second light actuated means for generating electrical signals respectively proportional to the illuminance and the irradiance characteristics of the light source, and means actuated by said signals to indicate the C.I.E. color rendering index of said source.

2. In the combination of claim 1 wherein said generating means comprises first detecting means responsive to the quantity of luminous flux per a given unit area and second detecting means responsive to the light energy per said given unit area.

3. In the combination of claim 2 said detecting means comprising a pair of photomultipliers and means positioned between said light source and said photomultipliers for controlling the response curves of said photomultipliers to correspond substantially to the illuminance and the irradiance characteristics of the light from the source.

4. In the combination of claim 2 said detecting means comprising a pair of thermopiles, and means positioned between said light source and said thermopiles for controlling the response curves of the thermopiles to correspond substantially to the illuminance and the irradiance characteristics of the light from the source.

5. In the combination of claim 2 said detecting means comprising a pair of photocells, and means positioned between said light source and said photocells for controlling the response curves of the photocells to correspond substantially to the illuminance and the irradiance characteristics of the light from the source.

6. In the combination of claim 1 said indicating means comprising a digital ratiometer.

7. Apparatus for determining the C.I.E. color rendition index of "white" type fluorescent light sources comprising light actuated means for generating electric signals respectively proportional to the illuminance and the irradiance characteristics of the light source, a bridge circuit supplied by the electrical signals of said generating means, an adjustable impedance in said bridge circuit, a null indicating meter connected in said bridge circuit to be actuated by the output signal of said bridge circuit, and a color rendering index calibrated indicator actuated with said adjustable impedance.

8. In the combination of claim 7, said generating means comprising photocells.

9. In the combination of claim 7 said generating means comprising photoconductors.

10. In the combination of claim 7 said adjustable impedance including a servo motor mechanism for effecting the adjustment of said impedance.

11. A meter for determining the C.I.E. color rendition index of "white" type fluorescent light sources comprising means for generating electrical signals respectively proportional to the illuminance and the irradiance characteristics of a light source, a current ratio indicating device connected to said generating means, a light attenuator positioned between said source and one of said generating means, and a color rendering index calibrating indicator actuated with said attenuator to control said null indicating meter.

12. In the combination of claim 1 wherein said indicating means includes means responsive to the ratio of the said electrical signals.

13. In the combination of claim 12 wherein said indicating means comprises a null balancing indicator, a potentiometer, and means connecting said potentiometer to said null balancing indicator and to said generating means to null the circuit.

14. Electrical apparatus for determining characteristics of "white" type fluorescent light sources comprising first and second detector means, means for operating said first and second detector means to simultaneously produce respective electrical signals corresponding to the illuminance and irradiance characteristics of said light source and means for taking the ratio of said two electrical signals.

References Cited

UNITED STATES PATENTS

| | | | |
|---|---|---|---|
| 2,064,517 | 12/1936 | Brice. | |
| 2,086,791 | 7/1937 | Dresler. | |
| 3,130,365 | 4/1964 | Minter | 324—140 |
| 2,455,116 | 11/1948 | Gittus | 88—14 X |
| 3,169,220 | 2/1965 | Holdo | 324—140 |
| 3,194,110 | 7/1965 | Eppig | 88—14 |
| 3,212,001 | 10/1965 | Marshall | 324—140 X |
| 3,147,680 | 9/1964 | Stimson. | |
| 3,327,124 | 6/1967 | Plum | 250—210 X |
| 2,019,871 | 11/1935 | Pettingill et al. | 250—218 X |

FOREIGN PATENTS 389,214  3/1933  Great Britain.

OTHER REFERENCES

"Color in Business, Science, and Industry," Judd & Wyszecki, J. Wiley & Sons, Inc., 2d ed. 1963, pp. 325–331.

"Colorimetry," by A. A. Shurkus, in Radio News, June 1944, pp. 25–27, 56, 58, 60.

"Photodetecting Instrument with Flat Wavelength Response," McPherson et al., J.O.S.A., vol. 51, No. 7, July 1961, p. 767.

"Filter Radiometry and Some of Its Applications," R. Starr, J.O.S.A., vol. 43, No. 11, November 1953, pp. 971–974.

"A Simple Empirical Method for Measuring Color Rendering Index," J. Shurgan, Illum. Eng. 61: 266–270, April 1966.

RONALD S. WILBERT, Primary Examiner

R. J. WEBSTER, Assistant Examiner

U.S. Cl. X.R.

73—355; 250—226; 324—40; 356—222, 226

PO-1050
(5/69)

UNITED STATES PATENT OFFICE
CERTIFICATE OF CORRECTION

Patent No. 3,506,364    Dated April 14, 1970

Inventor(s) Joel Shurgan and Luke Thorington

It is certified that error appears in the above-identified patent and that said Letters Patent are hereby corrected as shown below:

Col. 2, line 33, for "suiable" read --suitable--;

Col. 3, between lines 46 and 47, insert --is connected by the wire--;

Col. 4, line 8, for "S.I.E." read --C.I.E.--; line 61, omit "one".

SIGNED AND
SEALED
DEC 22 1970

(SEAL)
Attest:

Edward M. Fletcher, Jr.
Attesting Officer

WILLIAM E. SCHUYLER, JR.
Commissioner of Patents